United States Patent Office 3,728,282
Patented Apr. 17, 1973

3,728,282
LIQUID STABILIZERS FOR VINYL CHLORIDE POLYMERS
Walter P. Barie, Jr., Shaler Township, Allegheny County, Norman W. Franke, Penn Hills Township, Allegheny County, and Gary M. Singerman, Monroeville Borough, Pa., assignors to Gulf Research & Development Company, Pittsburgh, Pa.
No Drawing. Filed Oct. 6, 1970, Ser. No. 78,603
Int. Cl. B01j 1/16; C08f 45/56
U.S. Cl. 252—400                          6 Claims

ABSTRACT OF THE DISCLOSURE

The stabilization of polyvinyl chloride resins and polyvinyl chloride resin compositions with novel storage-stable liquid compositions comprising metal salts of linear aliphatic monocarboxylic acids, an acidic organophosphite or an acidic organophosphate and a hydrocarbon solvent.

---

This invention relates to novel storage-stable liquid compositions which may be employed in the stabilization of polyvinyl chloride resins and polyvinyl chloride resin compositions and it further relates to the stabilized resins. More particularly this invention relates to new storage-stable liquid stabilizer compositions for polyvinyl chloride resins and polyvinyl chloride resin compositions comprising various combinations of the barium, cadmium and/or zinc salts of linear aliphatic monocarboxylic acids, an acidic organophosphite or an acidic organophosphate, and a hydrocarbon solvent, all of which are defined and exemplified hereinbelow.

Halogen-containing polymers, such as polyvinyl chloride homopolymers and copolymers, are useful because of their desirable physical properties. In many cases, however, such resins are susceptible to discoloration due to heat degradation. This is especially troublesome in the course of compounding these resins at elevated temperatures and during long heating, as in milling, thus limiting the use of such resins until various stabilizing materials and compositions were developed which would protect against such degradation and discoloration.

Many heat stabilizers are known to the art. Among the more important heat stabilizers in commercial use are mild alkalis such as sodium carbonate, disodium phosphate, and sodium and potassium salts of partially esterified phosphoric acids; inorganic and organic lead salts; organotin carboxylates, organotin mercaptides; various metal-free organic compounds such as soybean oil epoxide, isooctyl epoxystearate and the diglycidyl ether of 2,2-bis(p-hydroxyphenyl)propane. For detailed discussion of heat stabilizers for vinyl halide resins, reference may be made to the articles by N. L. Perry, "Barium-Cadmium Stabilization of Polyvinyl Chloride," Rubber Age 85, pages 449 to 452 (June 1959) and by H. Verity-Smith, British Plastics 27, pages 176 to 179, 213 to 217, 307 to 311 (1954).

During the compounding of polyvinyl chloride resin compositions it is often advantageous to add the stabilizer material in a liquid rather than in a solid form. Most of the metallic stabilizer materials in current use, however, are in themselves solid materials and a continuing interest exists in developing systems which may be used to dissolve these solids and which will keep them in solution for long periods of time without precipitation. Toward this end, limited success has been achieved by other workers in the field who have prepared a few storage-stable liquid compositions wherein the solvent is a polar liquid such as an alcohol, for example isooctyl alcohol, an ester such as dioctyl phthalate, an organic carboxylic acid in conjunction with an alkylene glycol such as 2-hexoxyethanol, or any combination of these solvents or like polar liquids. The non-polar hydrocarbon solvents, which are defined hereinbelow and which are more readily available and less expensive than the polar solvents just mentioned, are not generally used in liquid metallic-salt stabilizer compositions because the salts used in these compositions are not sufficiently soluble in these hydrocarbon solvent. Furthermore, the heavy metal salts used in previous liquid stabilizer compositions are generally a barium, cadmium and/or zinc salt of a branched-chain acid such as 2-ethylhexanoic acid or an alkylphenol such as nonylphenol, or a combination of these types, because these may be easily dissolved in the polar solvents mentioned hereinabove. Metals salts of the linear aliphatic monocarboxylic acids such as octanoic acid are less readily soluble, or are substantially insoluble, in these polar liquids and are likewise either insoluble or lack solution stability in hydrocarbon solvents. Even so, it is well known that the barium, cadmium and zinc salts of the linear aliphatic monocarboxylic acids are excellent polyvinyl chloride resin stabilizers and that it is often advantageous to use them in liquid form if such a form were available. We have ascertained that these salts of the linear aliphatic monocarboxylic acids are superior stabilizers in comparison with the corresponding branched chain acid salts.

Unexpectedly, we have found that storage-stable solutions of a barium salt of a linear aliphatic carboxylic acid, for example nonanoic acid, a cadmium salt of this same type of acid, or a zinc salt of this same type of acid, or any combination of these salts in a hydrocarbon solvent may be obtained providing that the solution also contains an acidic organophosphite, for example diphenyl phosphite, or an acidic organophosphate, for example bis(2-ethylhexyl)phosphate. The acidic organophosphite or acidic organophosphate must be present as additives in the metal salt-hydrocarbon solvent mixture for a storage-stable liquid composition to result.

Accordingly, it is an object of the instant invention to provide liquid storage-stable compositions which are useful in stabilizing polyvinyl chloride resins and polyvinyl chloride resin compositions against thermal degradation and discoloration comprising the barium, cadmium or zinc salts of linear aliphatic monocarboxylic acids, or any combination of these, a liquid hydrocarbon solvent, an acidic organophosphite or an acidic organophosphate, and to provide resins stabilized therewith, all of which are defined and exemplified hereinbelow.

The polymers which may be heat-stabilized in accordance with this invention may typically be those which contain chlorine atoms bonded to the polymer chain. These polymers may be homopolymers including polyvinyl chloride-type polymers, e.g. polyvinyl chloride, polyvinylidene chloride, etc. They may also include copolymers formed by the copolymerization of vinyl chloride or vinylidene chloride with other ethylenically unsaturated monomers. Ethylenically unsaturated monomers may be compounds which contain polymerizable carbon-to-carbon double bonds and may include acrylates such as acrylic acid, ethyl acrylate, acrylonitrile, etc.; vinyl monomers such as styrene, vinyl acetate, etc.; maleates such as maleic acid, maleic anhydride, maleate esters, etc. These polymers are herein collectively called polyvinyl chloride polymers or resins for convenience.

The vinyl chloride polymers can also contain plasticizers such as dioctyl phthalate; lubricating agents such as stearic acid; pigments; fillers; etc. A total of from 0.5 to 10 parts by weight of the combined stabilizer combination of the invention excluding the hydrocarbon solvent can be used for each 100 parts by weight of the resin. More stabilizer composition can be used, but usually no better result is obtained, and therefore, such amounts are uneconomical and wasteful. Less stabilizer can be used but it is not likely to accomplish the desired degree of stabilization.

The barium, cadmium and zinc salts of the linear aliphatic monocarboxylic acids which may be employed in the practice of this invention may be the salts derived from the linear aliphatic monocarboxylic acids having from six to twelve carbon atoms inclusive, specifically hexanoic, heptanoic, octanoic, nonanoic, decanoic, undecanoic and lauric acids or any combination of these acids. Any one of the barium, cadmium or zinc salts of these acids or mixtures of these acids may be used alone, or any combination of two, or all three salts may be used together with the remaining components of the liquid stabilizer compositions described herein according to the needs of the user. It is preferred that all of the metal salt in the composition be the linear aliphatic acid salt since it is a superior stabilizer, however, if some of the stabilizer salt comprises an inferior stabilizer such as a metal salt of a branch chain acid, the composition will function as a stabilizer at reduced effectiveness. Also salts of an alkylphenol such as nonylphenol or octylphenol can also comprise a portion of the metal salt stabilizer component.

The acidic organophosphites which are employed in the practice of this invention are represented by the formula

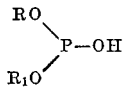

wherein R is hydrogen or an organic radical having from one to about 18 carbon atoms and preferably two to about 10 carbon atoms selected from aryl including alkyl-substituted aryl, alkyl including aryl-substituted alkyl, cycloaliphatic, and oxygen-carbon heterocyclic groups and $R_1$ independently is an organic radical as defined for R. Exemplary are diphenyl phosphite, monophenyl phosphite, mono(diphenyl)phosphite, dicresyl phosphite, di(o-isooctylphenyl)phosphite, di(p - 2-ethylhexylphenyl)phosphite, di(p-t-octylphenyl)phosphite, di(dimethylphenyl) phosphite, di-n-butyl phosphite, di-2-ethylhexyl phosphite, mono-2-ethylhexyl phosphite, di-isooctyl phosphite, mono-isooctyl phosphite, monododecyl phosphite, 2-ethylhexyl phenyl phosphite, 2-ethylhexyl n-octylphenyl phosphite, monocyclohexyl phosphite, dicyclohexyl phosphite, di(2-cyclohexylphenyl)phosphite, di(1 - naphthyl)phosphite, di(diphenyl)phosphite, di(2-phenylethyl)phosphite, dibenzyl phosphite, monobenzyl phosphite, n-butyl cresyl phosphite, didodecyl phosphite, ethyl stearyl phosphite, ditetrahydrofurfuryl phosphite and difuryl phosphite. The preferred acidic organophosphites are liquids or low-melting solids.

The acidic organophosphates which are employed in the practice of this invention are represented by the formula

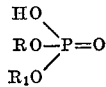

wherein R and $R_1$ are the same as above. Exemplary are diphenyl phosphate, monophenyl phosphate, p-octylphenyl phosphate, dicresyl phosphate, di(dimethylphenyl) phosphate, di-n-butyl phosphate, di(p-octylphenyl)phosphate, di(o - octylphenyl)phosphate, di(2 - ethylhexylphenyl)phosphate, di-2-ethylhexyl phosphate, mono-2-ethylhexyl phosphate, di-isooctyl phosphate, monoisooctyl phosphate, monododecyl phosphate, 2-ethylhexyl phenyl phosphate, 2-ethylhexyl p-octylphenyl phosphate, dicyclohexyl phosphate, monocyclohexyl phosphate, ethyl stearyl phosphate, di-tetrahydrofurfuryl phosphate, difuryl phosphate, di(2-cyclohexylphenyl)phosphate, di(1-naphthyl)phosphate, di(diphenyl)phosphate, diphenyl phenyl phosphate, benzyl octyl phosphate, di(2-phenyl-ethyl)phosphate, dibenzyl phosphate, monobenzyl phosphate, n-butyl cresyl phosphate, and di-dodecyl phosphate. The preferred acidic organophosphates are liquids or low-melting solids.

Neither neutral triorganophosphites nor inorganic phosphorus acids such as phosphrous acid or phosphoric acid can be used in producing the stable liquid compositions of this invention. That is, only organophosphates and organophosphites which have one or two organic radicals and one or two acidic hydrogen atoms can be used to produce the stable liquid compositions of this invention.

The hydrocarbons are a class of organic compounds which consist solely of the elements carbon and hydrogen. Those hydrocarbons which can be used in the practice of this invention include all of the hydrocarbons which are normally liquid at 20° C., or preferably lower temperatures and which have a boiling point at atmospheric pressure of at least 50° C., and preferably higher. These are selected from the group consisting of paraffins, cycloparaffins, olefinic hydrocarbons, aromatic hydrocarbons, and mixtures thereof. By the term "paraffins" is meant any open-chain, saturated hydrocarbon with the empirical formula $C_nH_{2n+2}$, for example hexane, dimethylpropylmethane, diethylmethylmethane, ethylisobutylmethane, heptane, methyldipropylmethane, octane, isooctane, 2,7-dimethyloctane, nonane, decane, dodecane and the like. By the term "cycloparaffins" it will be understood there is intended any cyclic hydrocarbon in which the ring is nonaromatic and which may be substituted with alkyl radicals and/or other carbocyclic ring structures condensed therewith. As exemplary of such cycloparaffins which can be used there can be mentioned cyclohexane, hexahydrotoluene, ethylcyclohexane, hexahydro-m-xylene, hexahydro-p-xylene, hexahydrocumene, Decalin, p-menthane, methylcyclopentane, butylcyclopentane, the naphthenes which are generally derivatives of cyclopentane and cyclohexane occurring in petroleum of various origins and the like and mixtures thereof. By the term "olefinic hydrocarbons" it will be understood that there is intended any hydrocarbon which contains at least one nonaromatic double bond, and which may be open-chained or cyclic or both. Exemplary are vinylcyclohexane, 1-decane, isooctene, 4-isopropyl-1-methyl-3-cyclohexene and the like. By the term "aromatic hydrocarbon" is meant the usual aromatic and alkyl-substituted aromatic compounds typified by benzene, toluene, xylene, butylbenzene, cumene, phenylcyclohexane, styrene, and the like. In the practice of the invention a petroleum fraction containing a mixture of the paraffins, cycloparaffins, olefinic and aromatic hydrocarbons can also be used. These hydrocarbon mixtures include the mineral oils, kerosene, heavy naphthas, light naphthas, etc. Thus, a preferred hydrocarbon solvent consists of 68 percent paraffins, 1.5 percent olefins, 24 percent naphthenes and 6.5 percent aromatic hydrocarbons.

Such stabilizer compositions of the invention comprise from about four to about 40 parts of the metal salt of a linear aliphatic monocarboxylic acid when used alone or from about four to about 60 parts of the metal salt when any two or three of these barium, cadmium or zinc salts are used in combination, from about five to about 70 parts of the acidic organophosphite or acidic organophosphate or combination of these, and from about 15 to about 80 parts of the hydrocarbon solvent, the parts of each component being based on 100 parts of the total stabilizer composition. A total of from 0.5 to 10 parts by weight of the stabilizer combination of the invention, excluding the hydrocarbon solvent, can be used for each 100 parts by weight of the polyvinyl chloride resin. More stabilizer composition can be used, but usually no better result is obtained. Less stabilizer can be used but it is not likely to accomplish the desired degree of stabilization.

While entirely optional with respect to the hereindescribed liquid compositions, there can be added, if desired, other materials to the compositions such as secondary stabilizers exemplified by the epoxidized vegetable oils, antioxidants, anticlouding agents such as the neutral triorganophosphites exemplified by triphenyl phosphite or isooctyl diphenyl phosphite, ultraviolet light absorbers, antistatic agents, etc., providing that these do not affect solution stability. In the event that some of these may be deleterious to solution stability they may be added separately to the resin formulation with the usual dyes, pigments, fillers, plasticizers, etc., as desired.

The following examples are illustrative of the invention, but there is no intention to limit the same thereto. In the examples, all parts and percentages are by weight, unless otherwise indicated, and temperatures are in degrees centigrade.

EXAMPLE 1

A mixture of 2.0 parts barium heptanoate, 3.0 parts of the coprecipitated cadmium salt of octanoic and nonanoic acids (from a 25:75 molar mixture of octanoic:nonanoic acids), 4.0 parts triphenyl phosphite, 3.0 parts diphenyl phosphite and 9.0 parts naphtha was heated and stirred until it began boiling and until the temperature of the solution reached 130°. An amount of naphtha corresponding to that which had been lost by boiling was added to the resulting solution. A small amount of sediment was removed by centrifugation to yield a clear, homogeneous liquid which after ten weeks of storage at room temperature remained clear, liquid and free of sediment. The naphtha used in this experiment is known as varnish maker's and painter's naphtha. It has a distillation range of about 119° to 143° and an approximate composition of 45 percent naphthenes (cycloparaffin hydrocarbons), 47 percent paraffins and 8 percent aromatic hydrocarbons. In the absence of diphenyl phosphite, a stable solution will not result from the formulation of this example; instead, the metal salts precipitate from solution shortly after the mixture is cooled to room temperature.

EXAMPLE 2

A mixture of 4.2 parts barium nonanoate, 3.2 parts cadmium nonanoate, 1.0 part zinc nonanoate, 4.7 parts isooctyl diphenyl phosphite, 2.0 parts diphenyl phosphite and 9.9 parts naphtha (the same as described in Example 1) was heated and processed according to Example 1 to give a homogeneous liquid which remained clear and free of sediment after the ten weeks of storage at room temperature. Two parts of the stabilizer composition of this example were blended with 100 parts of polyvinyl chloride resin (Geon 101), 50 parts diisooctyl phthalate, and 0.5 part stearic acid. The blend was milled for five minutes at 171° on a two-roll mill to give a clear, homogeneous sheet which was substantially colorless. In the absence of the stabilizer, it is not possible to obtain a clear, colorless sheet from this polyvinyl chloride formulation because the polymer is thermally degraded on the mill and becomes highly colored.

EXAMPLE 3

A mixture of 4.0 parts barium nonanoate, 3.0 parts cadmium nonanoate, 5.0 parts diphenyl phosphite and 10.0 parts naphtha (described in Example 1) was heated and processed according to Example 1 to give a homogeneous liquid which remained clear and free of sediment after ten weeks of storage at room temperature.

EXAMPLE 4

A mixture of 5.0 parts barium nonylphenoxide, 3.0 parts of the coprecipitated cadmium salt of octanoic and nonanoic acids (from a 1:1 molar mixture of octanoic and nonanoic acids), 3.0 parts octylphenyl phosphate, and 7.0 parts naphtha (described in Example 1) was heated and processed according to Example 1 to give a homogeneous liquid which remained clear and free of sediment after eight weeks of storage at room temperature.

EXAMPLE 5

A mixture of 4.0 parts barium nonanoate, 3.0 parts cadmium nonanoate, 6.0 parts di-n-butyl phosphite and 9.0 parts heptane was boiled and stirred until a homogeneous solution was formed. An amount of heptane corresponding to that which had been lost by boiling was added to the resulting solution. A small amount of sediment was removed by centrifugation to yield a homogeneous liquid which remained clear and free of sediment after eight weeks of storage at room temperature.

EXAMPLE 6

A mixture of 4.0 parts barium nonanoate, 3.0 parts cadmium nonanoate, 5.0 parts bis(2-ethylhexyl)phosphate, and 9.0 parts paraffin oil was heated and stirred until a homogeneous solution was formed. A small amount of sediment was removed by centrifugation to yield a homogeneous liquid which remained clear and free of sediment after eight weeks of storage at room temperature. The paraffin oil used in this example was a white paraffin oil, also known as white mineral oil or liquid petrolatum. It is a mixture of liquid hydrocarbons having a boiling range of about 330° to 390°.

EXAMPLE 7

A mixture of 5.0 parts cadmium hexanoate, 4.0 parts di-n-butyl phosphite, and 5.0 parts heptane was heated and processed according to Example 5 to give a homogeneous liquid which remained clear and free of sediment after six weeks of storage at room temperature.

EXAMPLE 8

A mixture of 3.0 parts barium octanoate, 2.0 parts cadmium hexanoate, 3.0 parts diphenyl phosphite, 2.0 parts bis(2-ethylhexyl)phosphite and 7.0 parts toluene was boiled and stirred until a homogeneous solution was formed. An amount of toluene corresponding to that which had been lost by boiling was added to the resulting solution. A small amount of sediment was removed by centrifugation to yield a homogeneous liquid which remained clear and free of sediment after six weeks of storage at room temperature.

EXAMPLE 9

A mixture of 3.0 parts barium octanoate, 2.0 parts cadmium, 3,5,5-trimethylhexanoate, 5.0 parts bis(2-ethylhexyl)phosphate, and 7.0 parts naphtha (described in Example 1) was heated and processed according to Example 1 to give a homogeneous liquid which remained clear and free of sediment after six weeks of storage at room temperature.

EXAMPLE 10

A mixture of 5.0 parts barium nonylphenoxide, 3.0 parts cadmium heptanoate, 4.0 parts octylphenyl phosphate and 10.0 parts naphtha (described in Example 1) was heated and processed according to Example 1 to give a homogeneous liquid which remained clear and free of sediment after six weeks of storage at room temperature. The stabilizer composition of this example (1.5 parts) was blended with 100 parts of polyvinyl chloride resin (Geon 101), 50 parts of di-isooctyl phthalate and 0.5 part stearic acid. The blend was milled for five minutes at 171° on a two-roll mill to give a clear, homogeneous sheet which was substantially colorless.

Although specific examples of the invention have been set forth hereinabove, it is not intended to limit the invention thereto, but to include all of the variations and modifications falling within the scope of the appended claims.

We claim:

1. A liquid storage-stable solution for stabilizing polyvinyl chloride resin compositions consisting essentially of
   (a) from about four to about 40 parts of a barium, cadmium or zinc salt of a linear aliphatic carboxylic acid having from about six to about 12 carbon atoms or from about four to about 60 parts of a mixture thereof;

(b) from about five to about 70 parts of an acidic organophosphite having the formula

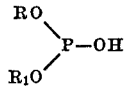

(c) or from about five to about 70 parts of an acidic organophosphate having the formula

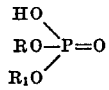

wherein R and $R_1$ have from one to 18 carbon atoms and are independently selected from aryl, alkyl, cycloaliphatic and oxygen-carbon heterocyclic; and (d) from about 15 to about 80 parts of a hydrocarbon solvent (which is liquid at 20° C. and which has a boiling point at atmospheric pressure of 50° C. or higher, the parts of each component being based on 100 parts of the total stabilizer composition.

2. A liquid storage-stable solution in accordance with claim 1 in which the acidic compound is an acid organophosphite.

3. A liquid storage-stable solution in accordance with claim 1 in which the acidic compound is an acidic organophosphate.

4. A liquid storage-stable solution in accordance with claim 1 in which R and $R_1$ have from two to about 10 carbon atoms.

5. A liquid storage-stable solution in accordance with claim 1 consisting essentially of from about four to 60 parts of a mixture of said metal salts of a linear aliphatic carboxylic acid, from about five to about 70 parts of the acidic organophosphite or the acid organophosphate and from about 15 to about 80 parts of the hydrocarbon solvent.

6. A liquid storage-stable solution in accordance with claim 1 consisting essentially of from about four to about 40 parts of a metal salt of a linear aliphatic carboxylic acid, from about five to about 70 parts of the acidic organophosphite or the acidic organophosphate and from about 15 to about 80 parts of the hydrocarbon solvent.

References Cited
UNITED STATES PATENTS

| | | | |
|---|---|---|---|
| 3,255,136 | 6/1966 | Hecker | 260—23 |
| 2,564,646 | 8/1951 | Leistner et al. | 260—45.7 P |
| 2,716,092 | 8/1955 | Leistner et al. | 260—45.7 |
| 2,997,454 | 8/1961 | Leistner et al. | 260—45.7 |
| 3,476,699 | 11/1969 | Kauder et al. | 260—45.7 P |

JOHN D. WELSH, Primary Examiner

U.S. Cl. X.R.

260—45.75 R, 45.7 P